United States Patent [19]

Braithwaite et al.

[11] 3,966,888

[45] June 29, 1976

[54] ANHYDROUS MAGNESIUM CHLORIDE USING ETHYLENE GLYCOL AND AMMONIA

[75] Inventors: David G. Braithwaite; Ronald J. Allain, both of Brookhaven, Miss.

[73] Assignee: Nalco Chemical Company, Oak Brook, Ill.

[22] Filed: Oct. 29, 1975

[21] Appl. No.: 626,813

[52] U.S. Cl. .................................. 423/498; 423/351
[51] Int. Cl.$^2$ ........................................ C01F 5/34
[58] Field of Search ........... 423/498, 463, 351, 356, 423/352

[56] References Cited
UNITED STATES PATENTS

| | | | |
|---|---|---|---|
| 3,092,450 | 6/1963 | Christensen | 423/498 |
| 3,352,634 | 11/1967 | Buchmann | 423/498 |
| 3,594,120 | 7/1971 | Bott et al. | 423/498 |

*Primary Examiner*—Edward Stern
*Attorney, Agent, or Firm*—John G. Premo; Robert A. Miller; Barry W. Sufrin

[57] ABSTRACT

Anhydrous magnesium chloride may be prepared from magnesium chloride hydrates by the following sequence of processing steps:

1. Dissolving the magnesium chloride hydrate in ethylene glycol to form a magnesium chloride hydrate solution.

2. Heating the thus-formed solution to remove all the water therefrom thereby forming a ethylene glycol anhydrous magnesium chloride solution.

3. Treating the water-free magnesium chloride-ethylene glycol solution with ammonia to form a magnesium chloride ammonia complex which precipitates from the ethylene glycol.

4. Removing the precipitate from the ethylene glycol and washing it with a low boiling solvent for ethylene glycol to remove any ethylene glycol entrained in the precipitate.

5. Heating the magnesium chloride ammonia complex to drive off the ammonia which leaves as a finished product completely anhydrous magnesium chloride.

4 Claims, No Drawings

ANHYDROUS MAGNESIUM CHLORIDE USING ETHYLENE GLYCOL AND AMMONIA

INTRODUCTION

One method of producing magnesium metal is by electrolyzing a molten salt bath in a cell which contains magnesium chloride. Hydrated magnesium chloride when used as a cell feed decreases the electrical efficiency of the cell. Also, hydrated magnesium chloride tends to produce oxides of magnesium which form a sludge which must be periodically removed from the cell. Excellent cell efficiency can be achieved if the magnesium chloride cell feed is completely anhydrous. Thus, if it were possible to feed completely anhydrous magnesium chloride to electrolytic cells used to produce magnesium, magnesium yields would be improved.

Many investigators have attempted to produce anhydrous magnesium chloride using a variety of schemes. One generalized approach involves dissolving hydrated magnesium chloride into an organic solvent, particularly polar organic solvents, to form a hydrated magnesium chloride solution. These solutions have been either heated or reacted with a precipitant which is heated to ostensibly remove the water from the magnesium chloride. A careful study of these various techniques shows them to be deficient in many respects.

A method often proposed for producing anhydrous magnesium chloride is to dissolve hydrated magnesium chloride into methanol and then heat this solution to expell water and methanol, thereby purportedly leaving as a distillation residue anhydrous magnesium chloride. The difficulty with such a procedure is explained in U.S. Pat. No. 3,440,066. This patent indicates that when the hydrated magnesium chloride solution complex is heated to remove the alcohol and water, severe decomposition of both the alcohol and magnesium chloride occurs. This produces an end product which contains large amounts of carbon and magnesium oxide. Such a product is a poor cell feed for the electrolytic production of magnesium metal from a magnesium salt bath.

Several of the more interesting schemes for producing anhydrous magnesium chloride which rely upon the solubility of magnesium chloride hydrates in a polar organic solvent are described in U.S. Pat. Nos. 2,381,994; 2,381,995 and 3,352,634.

U.S. Pat. No. 2,381,994 sets forth a technique whereby a hydrated magnesium chloride is dissolved in a monohydroxy saturated aliphatic alcohol which has a boiling point above 220°F. This solution is then heated to distill off the water and then is further heated to remove by distillation the remainder of the monohydroxy saturated aliphatic alcohol. When this procedure is followed, as is the case with the use of methanol as a solvent, the finished product contains quantities of magnesium oxide and carbon which indicates substantial decomposition of the alcohol occurs.

U.S. Pat. No. 2,381,995, which builds upon the teachings of U.S. Pat. No. 2,381,994, relies upon dissolving a hydrated magnesium chloride in a monohydroxy saturated aliphatic alcohol. This solution is then heated for a period of time sufficient to drive off the water present. The alleged water-free solution is treated with ammonia to precipitate a magnesium chloride ammonia complex which is then separated from the alcohol and heat-treated to drive the ammonia from the complex.

The difficulties experienced in actually practicing the techniques of U.S. Pat. No. 2,381,995 readily indicate to one skilled in the art that its method is inherently incapable of being adapted to largescale commercial operations.

In the first instance, when the alcohol solution of the hydrated magnesium chloride is heated to remove water therefrom, it is impossible to remove the water at about the boiling point of the alcohol employed. This is particularly true when isoamyl alcohol is used as the solvent for the hydrated magnesium chloride. Thus, the magnesium chloride is not fully dehydrated. When the alleged water-free magnesium chloride is ammonia precipitated from the alcohol as represented by the patentee in U.S. Pat. No. 2,381,995, a dense, wax-like precipitate occurs which contains large quantities of entrained alcohol. The density and wax-like character of the precipitate renders it incapable of being handled by commercial equipment to free the precipitate of entrained solvent. Thus, it is impossible to further process the precipitate without substantial losses of the solvent taking place during the ammonia removal phase of the process.

U.S. Pat. No. 3,352,634 is for all intents and purposes identical in its teachings to U.S. Pat. No. 2,381,995. The differences relate only to minor points. In one instance, the patentee suggests having a hydrocarbon liquid with the hydrated magnesium chloride solvent to aid in removing the water of hydration during the distillation step of the process. The patentee also suggests cooling the alleged water-free mixture prior to ammonia addition which increases the solubility of the ammonia in the so-called water-free magnesium chloride solvent solution.

The patentee, while listing a large number of solvents such as isoamyl alcohol and other monohydric alcohols, also suggests using other oxygenated solvents for dissolving the hydrated magnesium chloride and generically suggests ketones, glycols and diketones.

The only example set forth in this patent utilizes isoamyl alcohol. As previously indicated, isoamyl alcohol is incapable of completely dehydrating the hydrated magnesium chloride which is initially dissolved therein and, also, the ammonia complex which is precipitated therefrom is physically incapable of being further processed to release the magnesium chloride therefrom.

Thus, from the above discussion, it may be seen that even though several generic schemes have been presented for producing anhydrous magnesium chloride, they are incapable of so-doing for the several reasons discussed above. Our research has also shown that when propylene glycol or butylene glycol are substituted for monohydric alcohols, severe decomposition of these glycols takes place.

In our process it is possible to produce completely anhydrous magnesium chloride which contains less than 0.8% by weight of magnesium oxide. Our process uses readily available commercial chemicals which are capable of recovery and recycling in the process, thus minimizing any loss of ingredients.

Our process has the further advantage of allowing anhydrous magnesium chloride to be produced without any hydrochloric acid being produced, thus making the use of corrosion-resistant, expensive alloys an unnecessary part of a commercial-scale unit for practicing the process.

THE INVENTION

In accordance with the invention, anhydrous magnesium chloride is produced in accordance with the following steps:

1. A hydrated magnesium chloride is dissolved in anhydrous ethylene glycol to form an ethylene glycol magnesium chloride hydrate solution. The amount of magnesium chloride which is dissolved in the ethylene glycol may vary from between 5–20% by weight although it is preferred in the practice of our invention that the amount of hydrated magnesium chloride be within the range of 8–12% by weight of the solution.

The most common hydrate that would be used in the practice of our invention would be $MgCl_2 \cdot 6 H_2O$. While this is the most common form available, it is understood that other hydrates may be used. One known hydrate is the so-called 1.5 mole hydrate which is produced by roasting the 6 mole hydrate at elevated temperatures.

Magnesium chloride as produced commercially often contains other salts such as calcium salts or potassium salts. Illustrative of such a mixture is carnalite which is a mixture of magnesium chloride and potassium chloride which contains 6 moles of water. The salts which oftentimes are present with commercial magnesium chloride hydrates vary depending upon the source from which they are obtained.

When such salt mixtures are added to ethylene glycol, the non-magnesium salts precipitate therefrom, thus providing a relatively pure ethylene glycol hydrated magnesium chloride solution. After the precipitated salts are in the form of finely divided solids suspended throughout the hydrated magnesium chloride ethylene glycol solution. When this condition occurs, the hydrated magnesium chloride ethylene glycol solution may be filtered to remove the suspended salt contaminants therefrom.

2. In the second step of our process we heat the ethylene glycol hydrated magnesium chloride solution to a temperature of about 205°C. for a period of time sufficient to remove by distillation all of the water contained in the solution. As heat is applied to the solution, water begins to be distilled therefrom with the water removal continuing for about 1½ hours. The temperature increases gradually to about 205°C. At this point the ethylene glycol begins to come over with the amount of water slowly decreasing until at about the end of 2 hours only glycol is removed. After the water has been removed from the ethylene glycol, an analysis of the solution indicates it is completely water-free. We have discovered this step is performed more efficiently if the water-glycol distillation is carried out under vacuum. Excellent water removal is obtained in about 1 hour. It is possible to remove the water and a small amount of glycol from the ethylene glycol hydrated magnesium chloride solution using a temperature of about 160°C. when the solution is evacuated to 88 mm. The temperature will, of course, vary depending upon the particular amount of vacuum used during the distillation.

The use of vacuum distillation is preferred since we have found that when the ethylene glycol is heated to about 205°C., a very slight amount of glycol decomposition occurs which produces traces of aldehydes and ketones. While such decomposition is tolerable under laboratory conditions, it is beneficial from an economic standpoint when large-scale equipment is used to prevent this loss of glycol.

In commercial operations the glycol separated with the water would be vacuum-distilled to render the glycol anhydrous which would then, of course, be reused in dissolving additional hydrated magnesium chloride.

3. The anhydrous ethylene glycol magnesium chloride solution is then cooled to about $-15°$ – $50°C$. and, preferably, within the range of $0°$ – $25°C$. At this point the solution is treated with anhydrous ammonia to provide at least 6 moles of ammonia and, preferably, at least 9 moles of ammonia per mole of magnesium chloride present in the ethylene glycol solution. The ammonia addition can be relatively rapid although in small-scale laboratory preparations, the ammonia addition should take place over a period of time ranging between 1 – 2 hours.

It was found that by cooling the magnesium chloride ethylene glycol solution to the temperature indicated that the ammonia is more soluble therein and that a precipitate does not form until at least 6 moles of the ammonia have been added. After most of the ammonia is added to the glycol, a fine, white, grainy precipitate begins to form which is a water-free ammonia complex of the magnesium chloride. This fine precipitate is readily separated from the ethylene glycol where it is then subject to further processing.

4. The precipitated magnesium chloride ammonia complex is separated from the glycol solution by any known means such as decantation, filtration, centrifugation or combination of such means. It is, of course, necessary that the separation be conducted in a water-free atmosphere which may be provided by gases such as ammonia, argon, $CO_2$ or the like.

5. The precipitate is now washed with a low boiling point polar solvent, e.g. one having a lower boiling point than ethylene glycol, which is capable of removing the ethylene glycol entrained in the precipitate. Such solvents include methanol or ethanol with methanol being preferred. Certain ethers such as tetrahydrofuran or ethyl ether may be used. The wash solvent should not be a solvent for the precipitate.

After the glycol is extracted with the low boiling point solvent, the glycol-free magnesium chloride ammonia complex is slowly heated to within the range of 300° – 400°C. for a period of time sufficient to completely remove the ammonia which leaves as a residue a completely anhydrous magnesium chloride. In large-scale operations, the ammonia as well as the wash solvent released by this heat treatment step would be recovered for reuse.

By practicing the above steps, it is possible to produce a magnesium chloride which is completely water-free and has a magnesium oxide content less than 0.8% by weight. In most instances, the magnesium oxide content will be 0.5% or less. The magnesium chloride thus recovered from the process provides an excellent cell feed for producing magnesium metal.

To illustrate the several advantages of our invention, Example 1 is presented below. Example 2, which follows, utilizes the teachings of U.S. Pat. Nos. 2,381,995 and 3,352,634 to demonstrate that these proposed processes do not produce anhydrous magnesium chloride and, more importantly, furnish intermediate products which are incapable of being handled on a commercial scale.

EXAMPLE 1

Into a 3-neck, 1 liter flask fitted with a thermometer, stirring rod, and a condenser and receiver, was placed 300 grams of ethylene glycol. To this was added 40 grams of magnesium chloride ($MgCl_2 \cdot 6 H_2O$). The flask was evacuated by means of a laboratory vacuum pump to 88 mm. of pressure. An electric heating mantle was placed under the flask and the temperature slowly elevated until water began to distill (60°–70°C.) The heating and water distillation was continued 1 hour. Near the end of this heating period the last traces of water and a small amount of glycol was collected. The temperature was 155° C. at this time. A small portion of the glycol magnesium chloride solution was analyzed for water and was found to be water-free. The heat source was removed and the flask placed in an ice bath until the temperature had reached 15°C.

To the cooled reaction flask was added anhydrous ammonia, e.g. approximately 9 moles (1½ times the stoichiometric amount of magnesium chloride present). The ammonia was added over a one-hour period. After the first half hour of addition, a fine, grainy precipitate began to form and continued for about 15 minutes. Ammonia was then added for an additional 15 minutes.

The contents of the flask, which was a magnesium chloride ammonia complex slurried in ethylene glycol, was removed from the flask under an ammonia atmosphere and placed into a Buchner funnel fitted with filter paper. The ammonia atmosphere was maintained constantly to prevent moisture contamination. After filtering, the filter cake was washed with 100 milliliters of methanol and allowed to drain. It was then rewashed with an additional 25 milliliters of methanol. The analysis of the filter cake showed it to contain 49.9% magnesium chloride, 42.1% ammonia, and no water.

The complex was then transferred in an inert atmosphere into a 500 milliliter, 3-neck flask fitted with a stirrer and gas inlet line and an exit port. It was then swept with ammonia while the temperature of the contents of the flask was elevated between 250°–350°C. At this point ammonia feed was stopped and argon was fed into the contents of the flask. The flask was then slowly heated to 400°C. At the end of this time the heating was discontinued and the contents of the flask removed and analyzed. An analysis showed that the fine, white powder that remained was 99.5% completely anhydrous magnesium chloride which contained 0.5% magnesium oxide.

EXAMPLE 2

Using the procedure of Example 1, the following was changed to the reaction flask.

30 grams magnesium chloride $\cdot 6H_2O$ and 250 grams of isoamyl alcohol. The contents of the flask were heated up to 120°C. under reflux conditions (not under vacuum) as and in accordance with Example 1. The heating was continued for 4 hours. The solvent contained in the flask was analyzed for water. This analysis showed that 1.2% water still remained. The contents of the flask were then treated with ammonia in accordance with Example 1. The precipitate obtained at the end of 1½ hours was extremely voluminous and wax-like in character. It was impossible to filter on a Buchner funnel. After letting the contents of the flask dry in an atmosphere of nitrogen for several houros, it appeared to be air-dried. An analysis showed the waxy precipitate to contain 70% by weight of isoamyl alcohol. An analysis of the filter cake showed it to contain 14.2% of ammonia and 17.5% of magnesium chloride.

We claim:

1. A method of preparing anhydrous magnesium chloride from magnesium chloride hydrates which comprises the steps of:
   A. dissolving a magnesium chloride hydrate in ethylene glycol to form an ethylene glycol magnesium chloride hydrate solution;
   B. heating the ethylene glycol magnesium chloride hydrate solution to a temperature and for a period of time sufficient to remove all the water therefrom to produce an ethylene glycol anhydrous magnesium chloride solution;
   C. treating the ethylene glycol anhydrous magnesium chloride solution with ammonia to form a magnesium chloride ammonia complex which is insoluble in the ethylene glycol, with the temperature of the ethylene glycol magnesium chloride solution being within the range of between −15° to 50°C.;
   D. separating the magnesium chloride ammonia complex from the ethylene glycol;
   E. washing the magnesium ammonia complex with a polar solvent having a lower boiling point than ethylene glycol to remove any ethylene glycol entrained in the magnesium chloride ammonia complex;
   F. heating the magnesium chloride ammonia complex to a temperature and for a period of time sufficient to drive off the ammonia, thereby forming anhydrous magnesium chloride; and then,
   G. recovering anhydrous magnesium chloride which has a magnesium oxide content less than 0.8% by weight.

2. A method of preparing anhydrous magnesium chloride from magnesium chloride hydrates which comprises the steps of:
   A. dissolving a magnesium chloride hydrate in ethylene glycol to form an ethylene glycol magnesium chloride hydrate solution having a magnesium chloride hydrate concentration of from 5 to 20% by weight;
   B. heating the ethylene glycol magnesium chloride hydrate solution under vacuum to a temperature and for a period of time sufficient to remove all the water and a small portion of the ethylene glycol therefrom to produce an ethylene glycol anhydrous magnesium chloride solution;
   C. cooling the ethylene glycol anhydrous magnesium chloride solution to a temperature between −15° to 50°C.;
   D. treating the cooled ethylene glycol anhydrous magnesium chloride solution with at least 6 moles of ammonia, based on the magnesium chloride present in the ethylene glycol solution to form a magnesium chloride ammonia complex which is insoluble in ethylene glycol;
   E. separating the magnesium chloride ammonia complex from the ethylene glycol;
   F. washing the magnesium chloride ammonia complex with methanol or tetrahydrofuran to remove any ethylene glycol entrained in the magnesium chloride ammonia complex;
   G. heating the magnesium chloride ammonia complex to a temperature between 300° – 400°C. for a period of time sufficient to drive off the ammonia thereby forming anhydrous magnesium chloride; and then, H. recovering anhydrous magnesium chloride which has a magnesium oxide content less than 0.8% by weight.

3. The method of claim 2 wherein the concentration of the magnesium chloride hydrate dissolved in the ethylene glycol is within the range of from 8 – 12% by weight and the ethylene glycol anhydrous magnesium chloride solution is cooled to a temperature between 0° – 25°C. prior to ammonia addition thereto.

4. A method of preparing anhydrous magnesium chloride from magnesium chloride hydrates which comprises the steps of:

A. dissolving 8 – 12% by weight a magnesium chloride six mole hydrate in ethylene glycol to form an ethylene glycol magnesium chloride hydrate solution;

B. heating the ethylene glycol magnesium chloride hydrate solution to a temperature and for a period of time under vacuum sufficient to remove all the water therefrom to produce an ethylene glycol anhydrous magnesium chloride solution;

C. treating the ethylene glycol anhydrous magnesium chloride solution with at least 6 moles of ammonia to form a magnesium chloride ammonia complex which is insoluble in the ethylene glycol with the temperature of the ethylene glycol magnesium chloride solution being within the range of between 0° – 25°C.;

D. separating the magnesium chloride ammonia complex from the ethylene glycol;

E. washing the magnesium ammonia complex from a polar solvent having a lower boiling point than ethylene glycol solvent to remove any ethylene glycol entrained in the magnesium chloride ammonia complex, said polar solvent being selected from the group consisting of methanol, ethanol, ethyl ether and tetrahydrofuran;

F. heating the magnesium chloride ammonia complex to a temperature between 300° – 400°C. and for a period of time sufficient to drive off the ammonia, thereby forming anhydrous magnesium chloride; and then, G. recovering anhydrous magnesium chloride which has a magnesium oxide content less than 0.8% by weight.

* * * * *